United States Patent [19]

Stegbauer et al.

[11] Patent Number: 5,495,339
[45] Date of Patent: Feb. 27, 1996

[54] SCHEDULING MULTIPLE DISK REQUESTS AND WRITING DATA BUFFERS TO DISK

[75] Inventors: Randall J. Stegbauer, Ontario; Anthony M. Federico, Webster; Ronald A. Ippolito, Rochester; Christopher Comparetta, Pittsford; Colleen R. Enzien, Penfield; Kitty Sathi, Pittsford; Ernest L. Legg, Fairport; Thomas M. Frey, Penfield, all of N.Y.

[73] Assignee: Xerox Corporation, Stamford, Conn.

[21] Appl. No.: 746,529

[22] Filed: Aug. 19, 1991

[51] Int. Cl.[6] .............................. H04N 1/21; H04N 1/00; H04N 1/40
[52] U.S. Cl. ..................... 358/296; 358/404; 358/444
[58] Field of Search .................................. 358/296, 404, 358/444, 468, 300; 355/202

[56] References Cited

U.S. PATENT DOCUMENTS

| | | | |
|---|---|---|---|
| 4,338,023 | 7/1982 | McGibbon | 355/14 SH |
| 4,589,093 | 5/1986 | Ippolito et al. | 364/900 |
| 4,719,516 | 1/1988 | Nagashima | 358/444 X |
| 4,748,513 | 5/1988 | Yamada | 358/444 |
| 4,800,521 | 1/1992 | Carter et al. | 364/900 |
| 5,021,892 | 6/1991 | Kita et al. | 358/468 |
| 5,025,483 | 6/1991 | Dinan et al. | 358/404 X |
| 5,087,979 | 2/1992 | Schaertel | 358/444 X |
| 5,218,456 | 6/1993 | Stegbauer et al. | 358/404 |

*Primary Examiner*—Peter S. Wong
*Assistant Examiner*—Eric Frahm
*Attorney, Agent, or Firm*—Ronald F. Chapuran

[57] ABSTRACT

An electronic image processing apparatus comprising an electronic scanner and an electronic printer for forming an image, a controller for directing the operation of the image processing means, the controller including a mass memory device for storing data to be printed, random access memory, a printer control, and a Resource Manager for ensuring access to the random access memory for conveying data from the mass memory device to the printer via the random access memory, the Resource Manager including a mass memory device scheduler to provide printer access to the random access memory, the mass memory device scheduler having a reservation queue to reserve mass memory device access at predetermined times, delay means to determine that access to the mass memory device is invalid within a given time, and means to convey disk request operations to said reservation queue in order to provide guaranteed random access memory at predetermined times.

18 Claims, 11 Drawing Sheets

SCHEDULING MULTIPLE DISK REQUESTS AND WRITING DATA BUFFERS TO DISK

BACKGROUND OF THE INVENTION

The invention relates to a Resource Manager, and more particularly, to a technique for scheduling multiple disk requests with guaranteed completion times and writing data buffers to disk to free memory.

As electronic imaging machines become more complex and versatile in operation, there is a greater demand for higher performance and expectations from limited resources. A suitable control must be able to not only coordinate the operation of the various components of the machine such as the scanner and the printer but must also be able to schedule and allocate key control elements such as random access memory and disk or mass memory to provide the most efficient and productive operation of these components.

In the prior art, U.S. Pat. No. 4,589,093 discloses a Timer Manager for suspending tasks waiting for switch or sensor input, or waiting for a real time or machine clock delay. U.S. Pat. No. 4,338,023 teaches a technique of job recovery employing the efficient use of machine resources depending upon the type of recovery required and the particular use of the resources. U.S. Pat. No. 4,800,521 discloses a task control manager for executing a plurality of tasks concurrently.

A difficulty with the prior art machine systems is the need for sufficient memory to handle high speed resources concurrently such as scanning and printing or alternatively the need for an adequate resource manager to handle such operations. Often, the insufficiency of memory space results in error messages or re-requests to the control for memory allocation resulting in delay and prolonging of the reproduction or printing cycle. It would also be desirable to be able to provide a scheme to resolve multiple requests for memory and be able to guarantee memory availability at a predetermined time.

It is an object, therefore, of the present invention to guarantee the time when memory or a mass memory access can be completed. Another object of the present invention to predict when memory will become available and to provide requesters of memory space guaranteed time of memory availability in order that the requesters can determine a further course of action. Other advantages of the present invention will become apparent as the following description proceeds, and the features characterizing the invention will be pointed out with particularity in the claims annexed to and forming a part of this specification.

SUMMARY OF THE INVENTION

Briefly, the present invention is an electronic image processing apparatus comprising an electronic scanner and an electronic printer for forming an image, a controller for directing the operation of the image processing means, the controller including a mass memory device for storing data to be printed, random access memory, a printer and a resource manager for ensuring access to the random access memory for conveying data from the mass memory device to the printer, the resource manager including a mass memory device scheduler to provide printer access to the random access memory, the mass memory device scheduler having a reservation queue to reserve mass memory device access at predetermined times, delay means to determine that access to the mass memory device is invalid within a given time, and means to raise the priority of requests in order to provide guaranteed random access memory at predetermined times.

For a better understanding of the present invention, reference may be had to the accompanying drawings wherein the same reference numerals have been applied to like parts and wherein:

DETAILED DESCRIPTION OF THE DRAWINGS

Figure 5A:
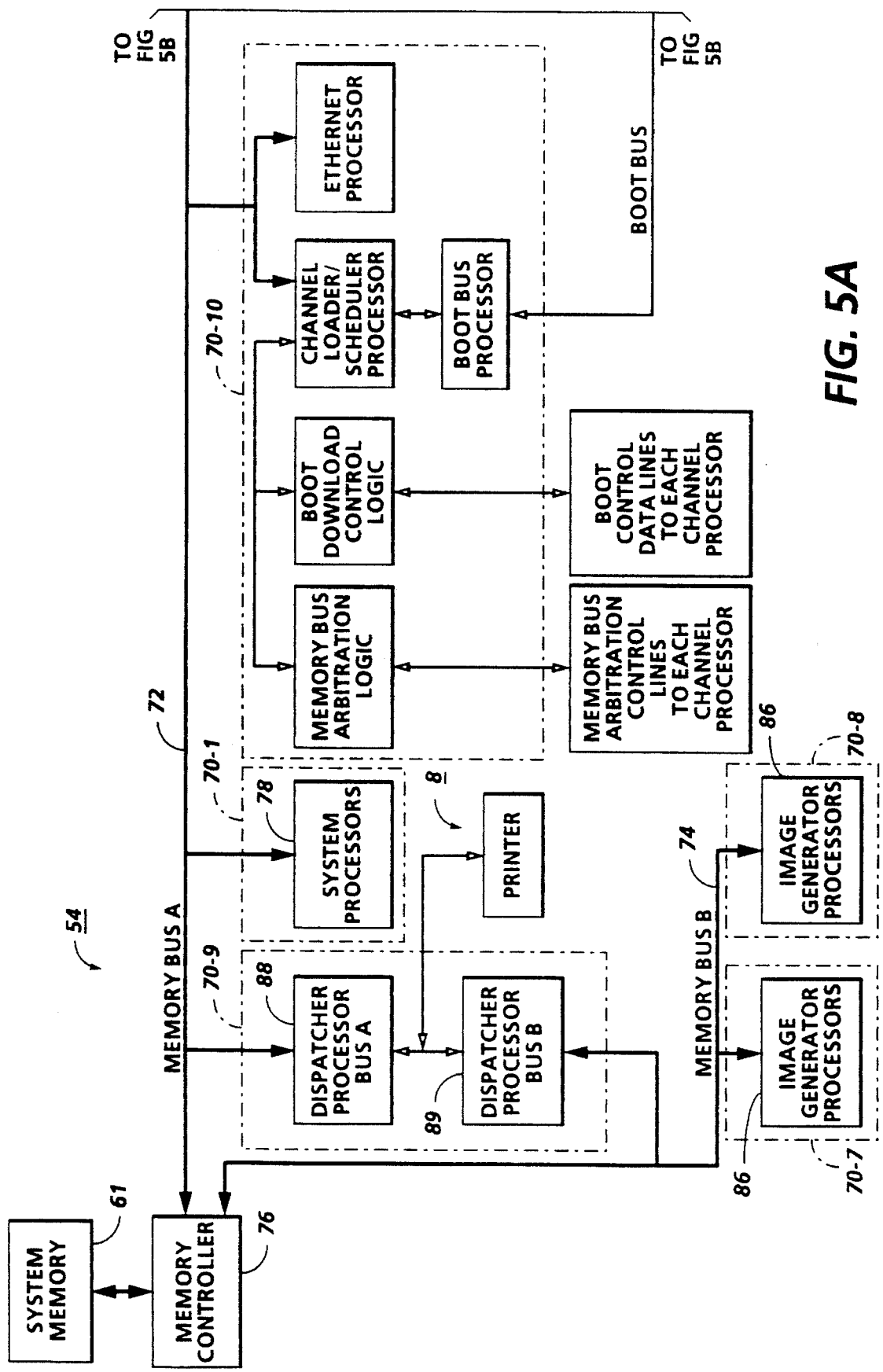
Figure 5B:
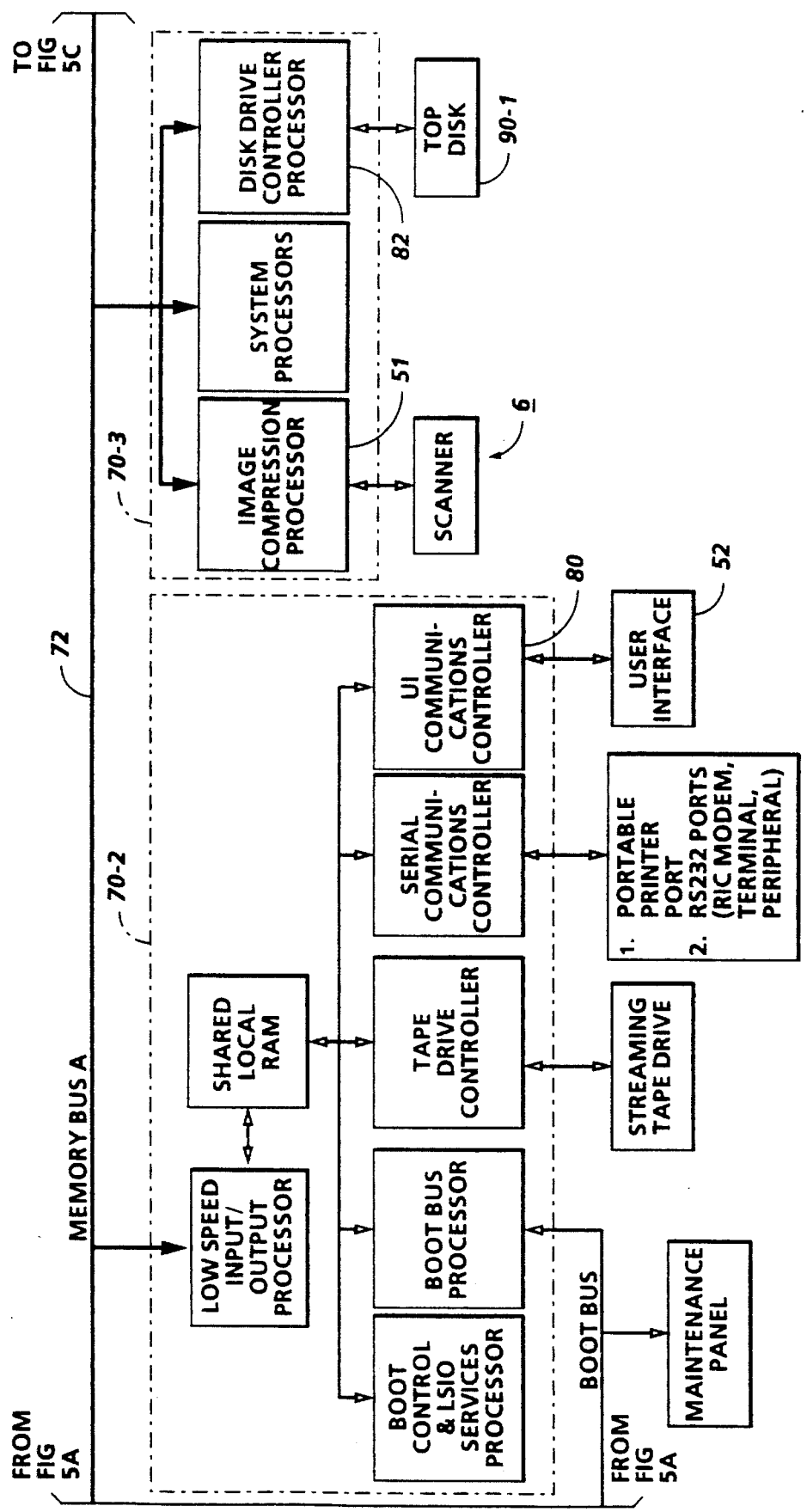
Figure 5C:
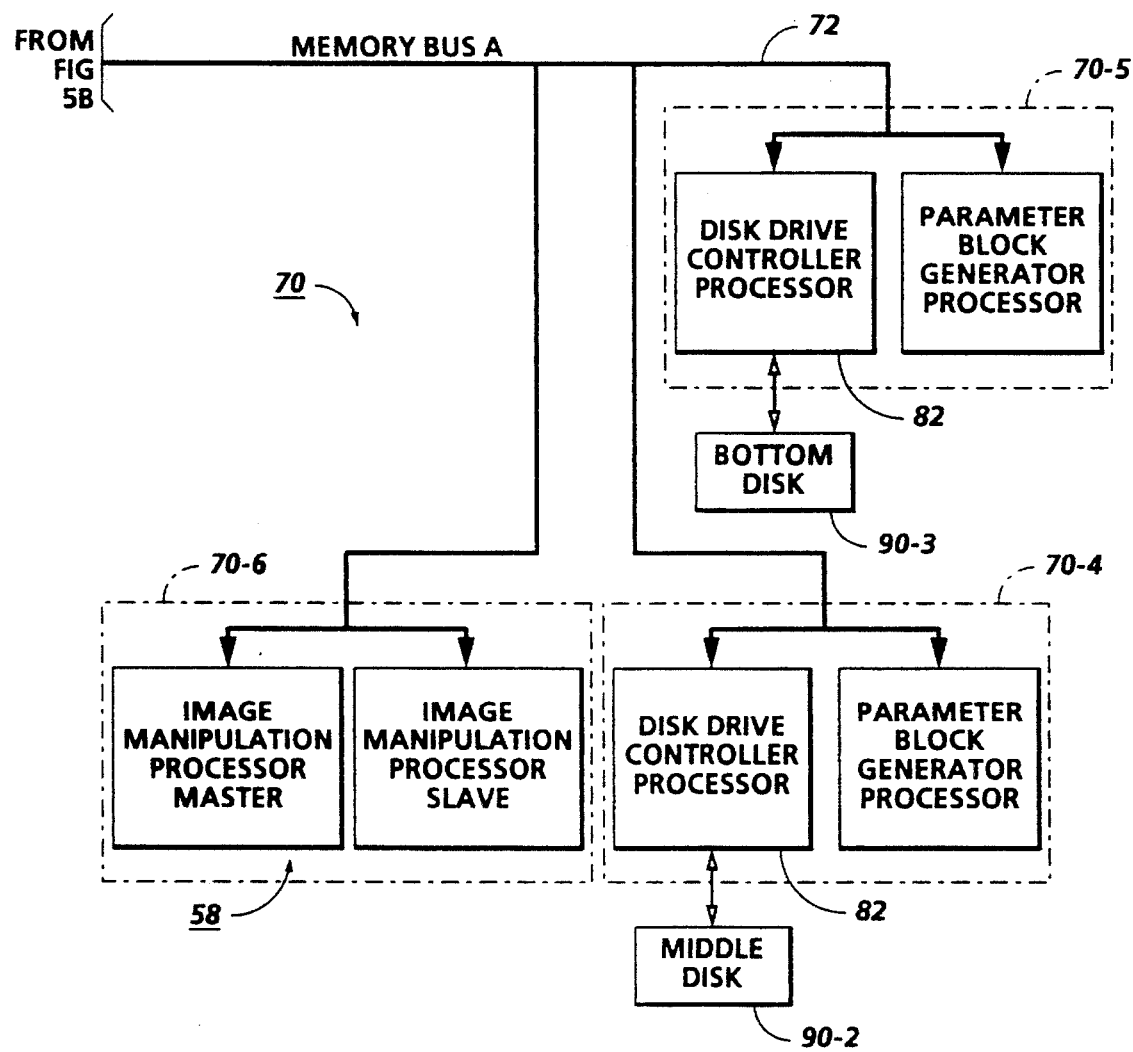
Figure 6:
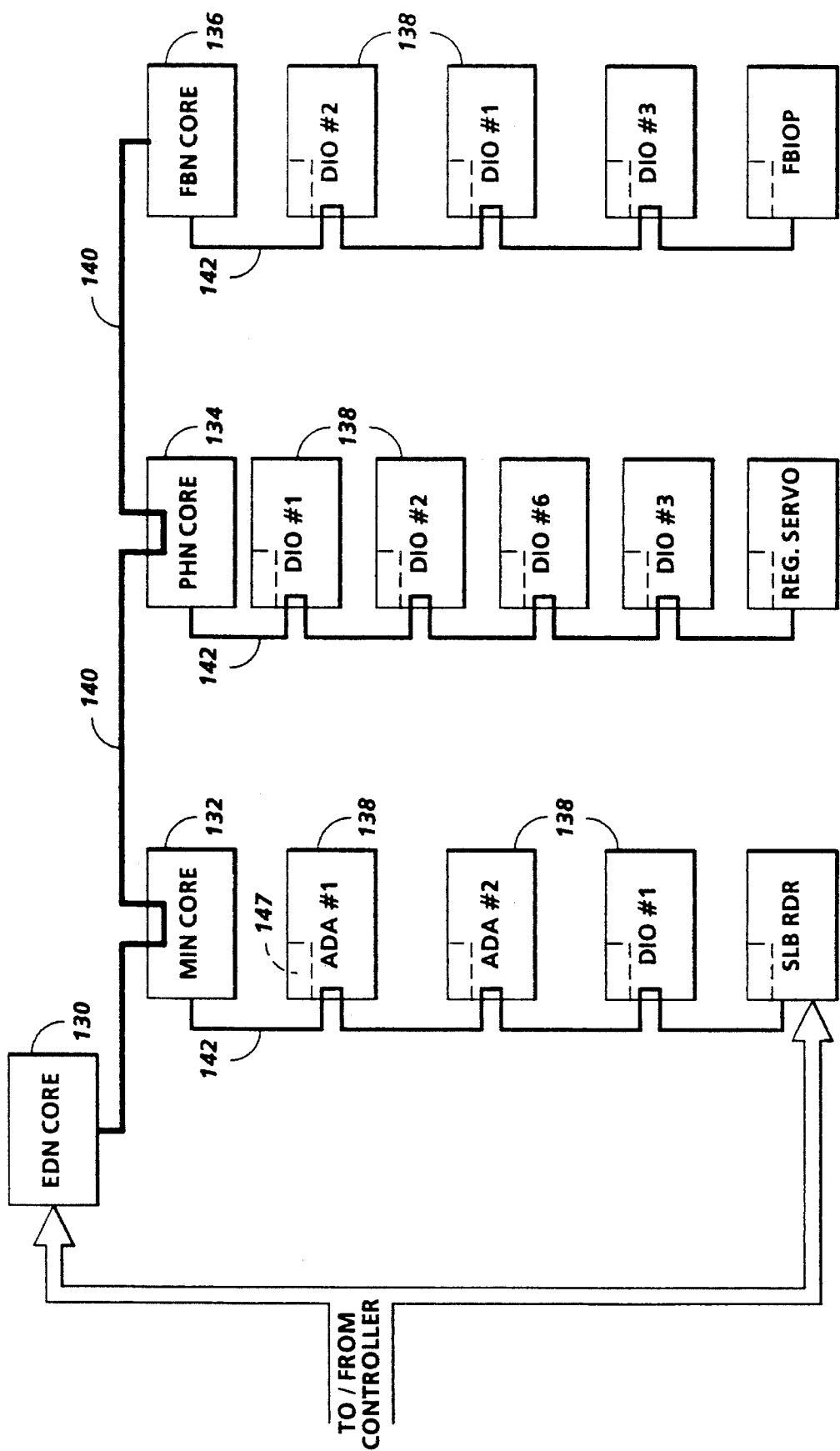
Figure 7:
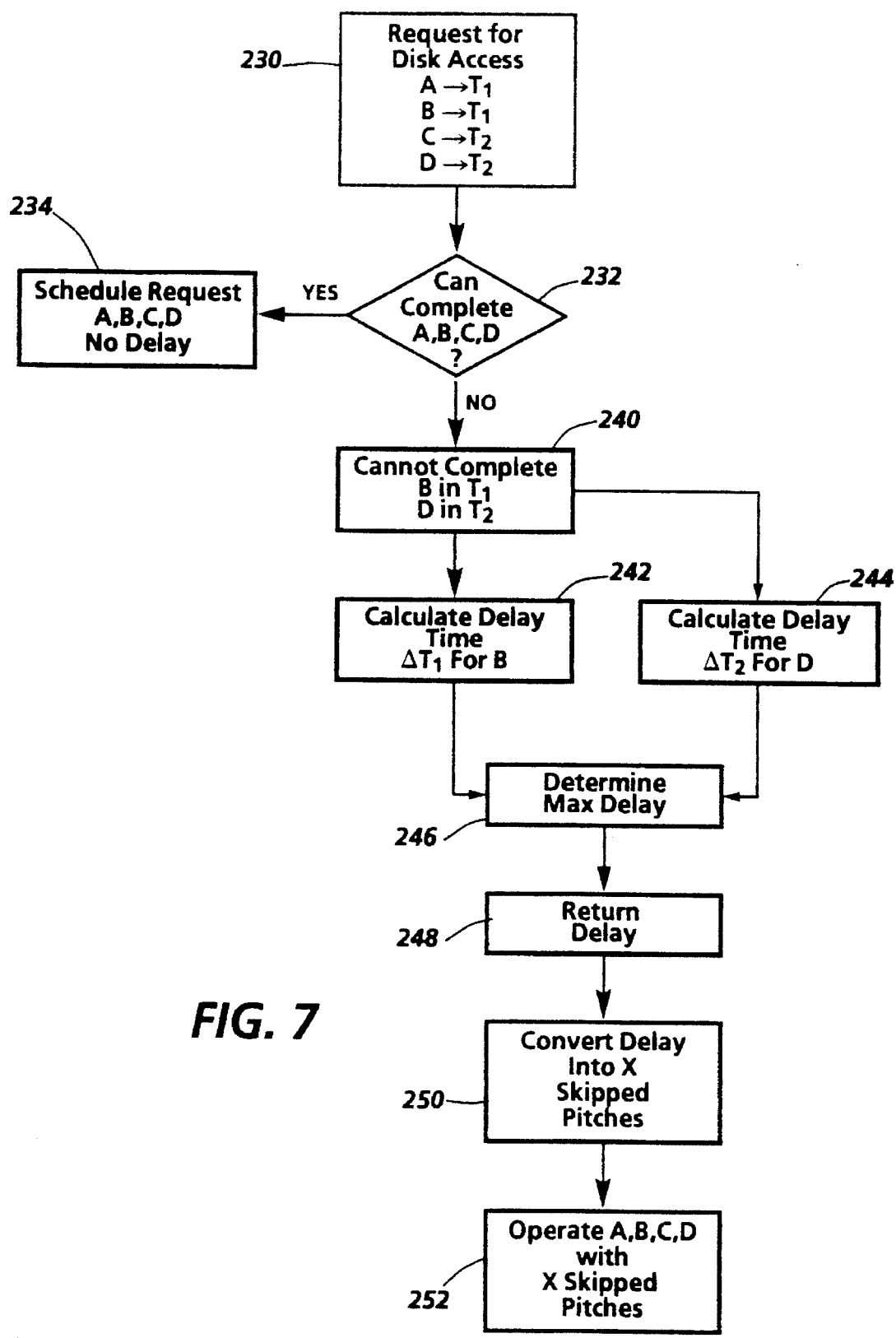
Figure 8:
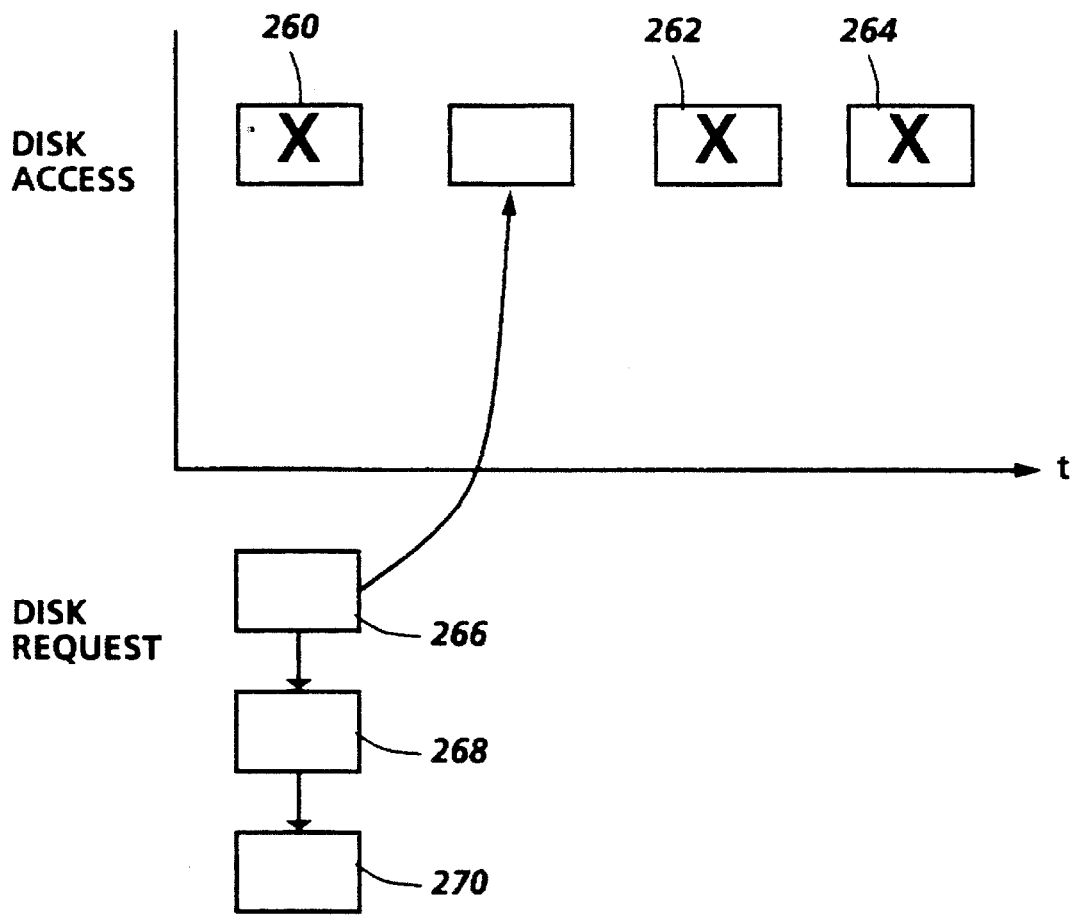
Figure 9:
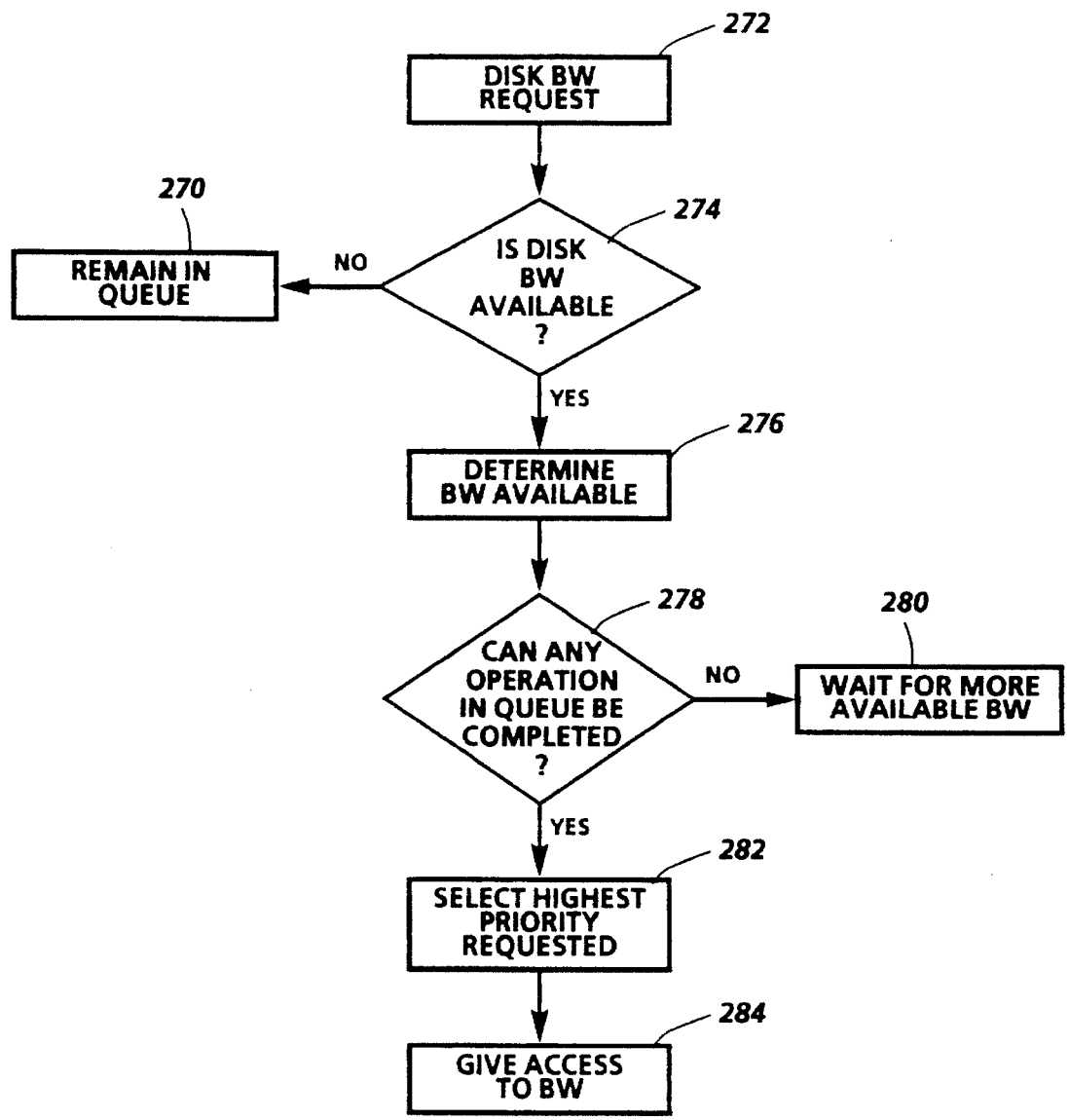

FIGS. 5A, 5B, and 5C comprise a schematic block diagram showing the major parts of the system control section;

FIG. 6 is a block diagram depicting the Operating System, with Printed Wiring Boards and shared line connections;

FIG. 7 is a flow chart illustrating disk allocation in accordance with the present invention;

FIG. 8 is a schematic of the disk access queue in accordance with the present invention; and FIG. 9 is a flow chart illustrating the disk access queue of FIG. 8.

DETAILED DESCRIPTION OF THE PREFERRED EMBODIMENT

Figure 1:
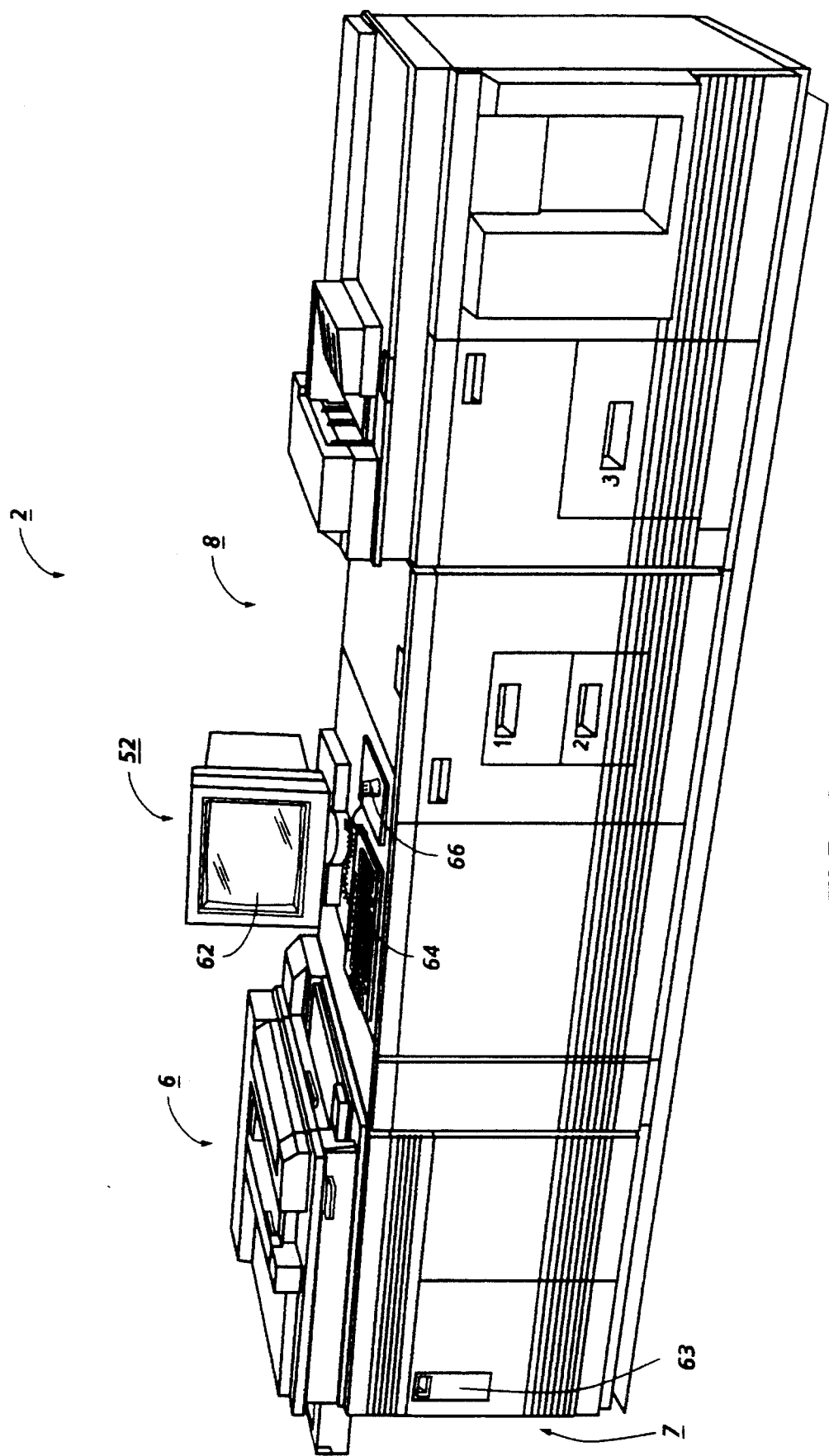
FIG. 1 is a view depicting an electronic printing system with the job supplement of the present invention allowing building of print jobs from diverse inputs or in response to special programming instructions.
Figure 2:
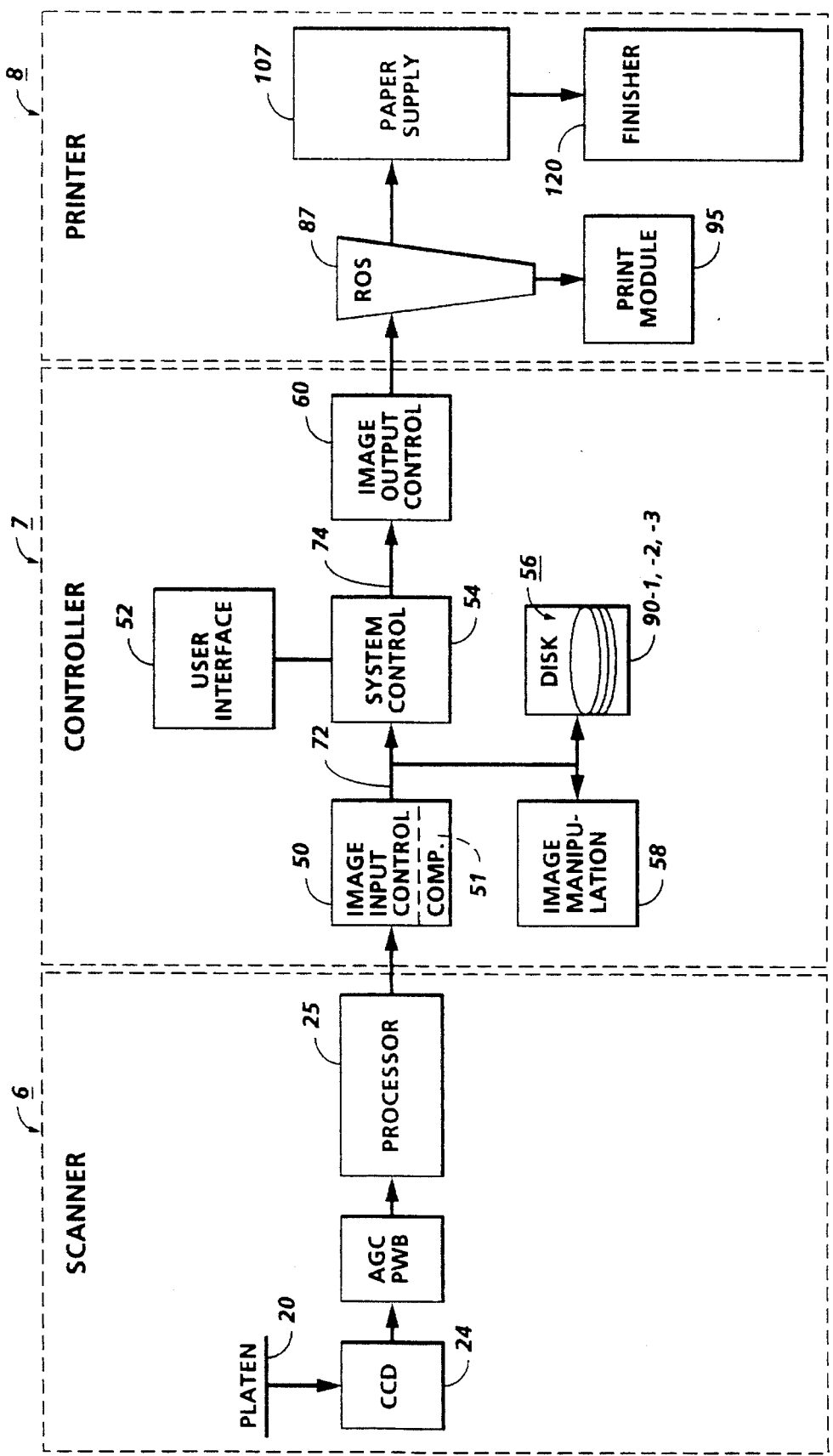
FIG. 2 is a block diagram depicting the major elements of the printing system shown in FIG. 1.

Referring to FIGS. 1 and 2, there is shown an exemplary laser based printing system 2 for processing print jobs in accordance with the teachings of the present invention. Printing system 2 for purposes of explanation is divided into a scanner section 6, controller section 7, and printer section 8. While a specific printing system is shown and described, the present invention may be used with other types of printing systems such as ink jet, ionographic, etc.

Figure 3:
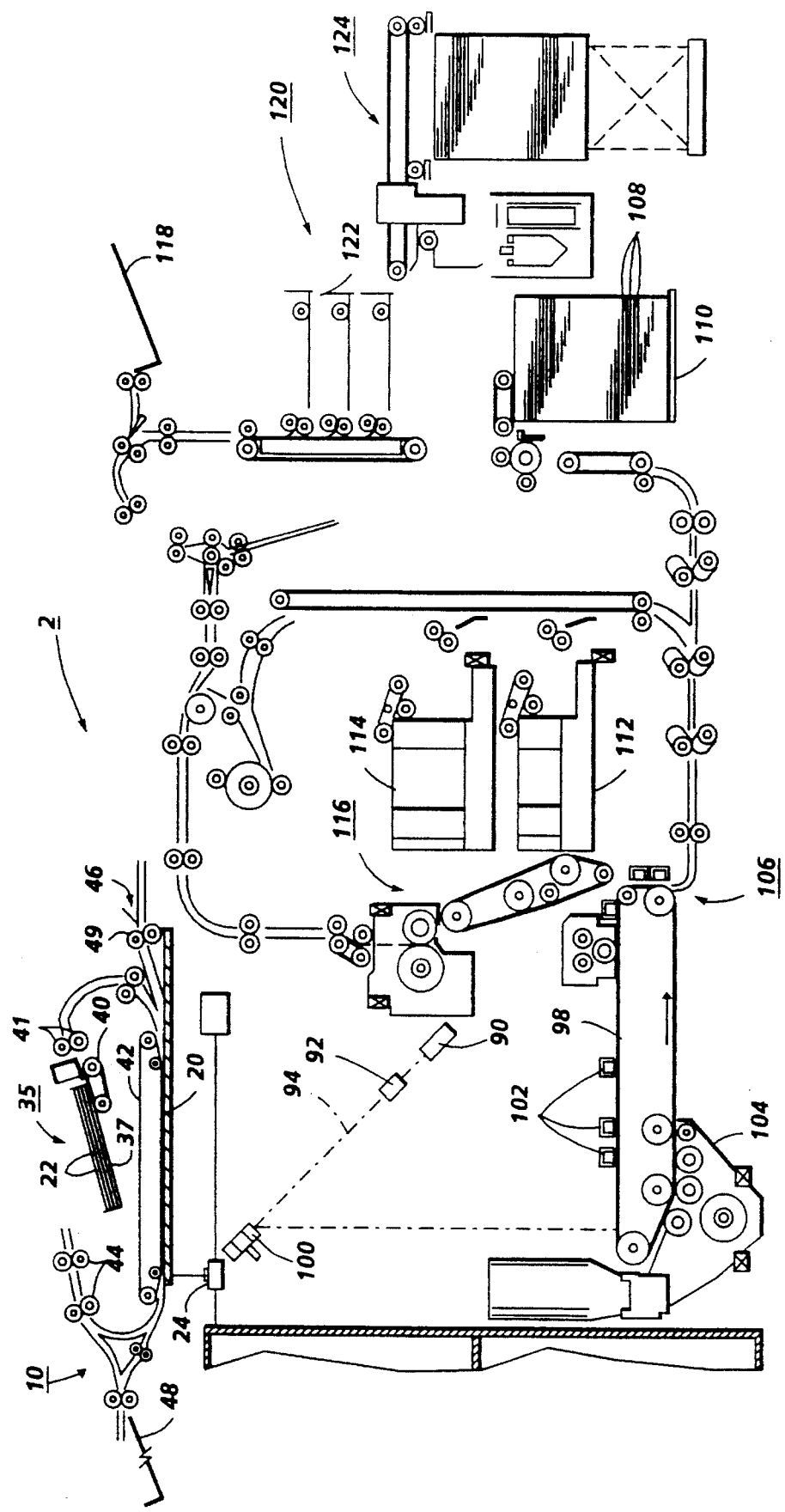
FIG. 3 is a plan view illustrating the principal mechanical components of the printing system shown in FIG. 1.
Figure 4:
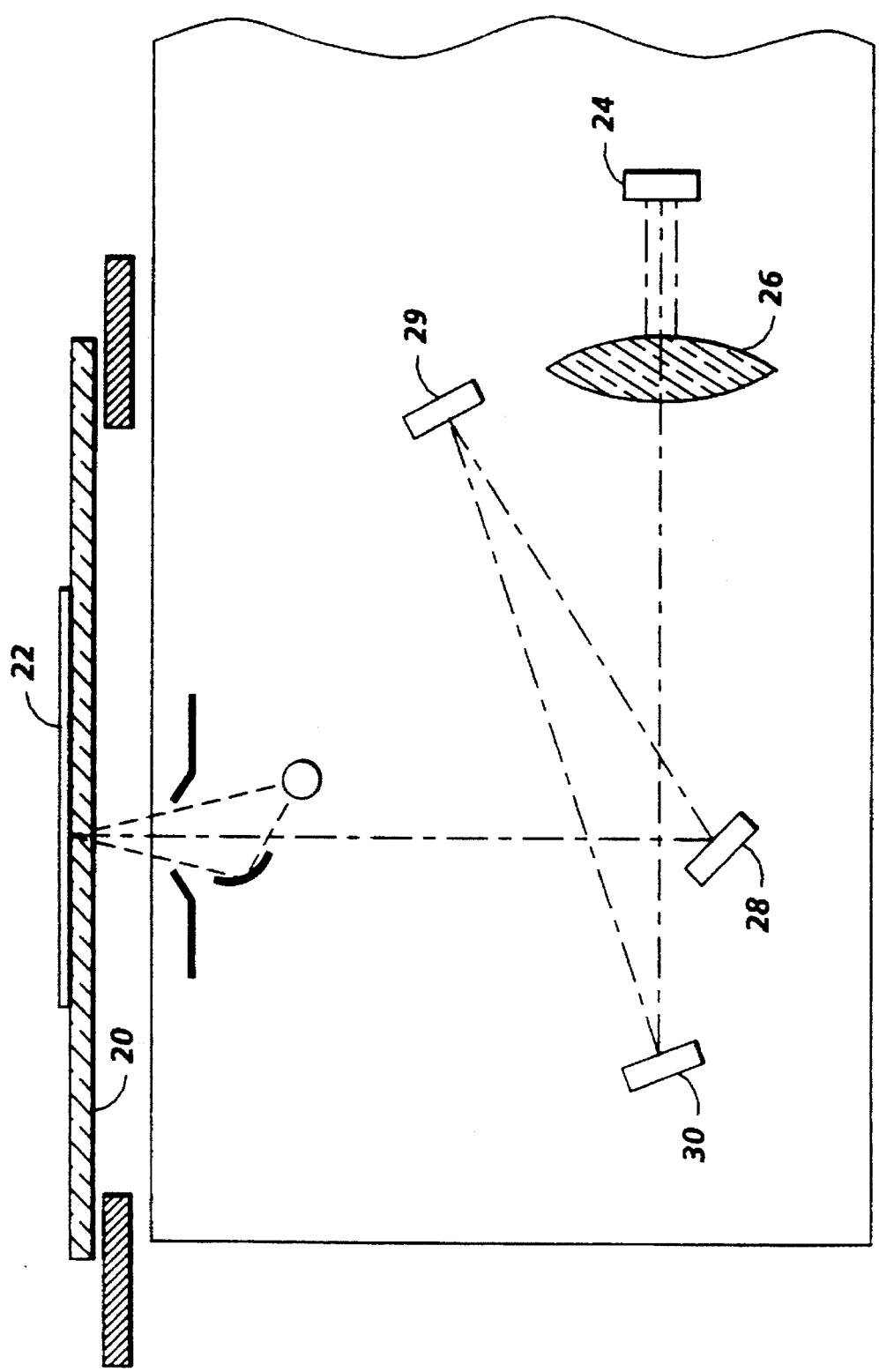
FIG. 4 is a schematic view showing certain construction details of the document scanner.

Referring particularly to FIGS. 2–4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line like segment of platen 20 and the document being scanned thereon. Array 24 provides image signals or pixels representative of the image scanned which after suitable processing by processor 25, are output to controller section 7.

Processor 25 converts the analog image signals output by array 24 to digital and processes the image signals as required to enable system 2 to store and handle the image data in the form required to carry out the job programmed. Processor 25, for example, may provide enhancements and changes to the image signals such as filtering, thresholding, screening, cropping, etc.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40 and document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the manual mode, document handler 35 is pivoted upwardly to expose platen 20. This permits the document 22 to be manually placed on platen 20 following which array 24 is operated to scan the document. When scanning is completed, the document is removed to clear platen 20 for the next document. For Book mode, the book is manually positioned face down on platen 20 with the center line of the book aligned with positioning indicia (not shown) located along the border of platen 20. By programming tile system, either one or both of the pages of the book open on the platen are scanned. The process is repeated for different pages of the book until all of the pages desired have been scanned following which the book is removed to clear platen 20.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and for purposes of explanation is separated into a Raster Output Scanner (ROS) section 87, Print Module Section 95, Paper Supply section 107, and Finisher 120. ROS 95 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108, as will appear, may comprise any of a variety of sheet sizes, types, and colors. For transfer, the print media is brought forward in timed registration with the developed image on photoreceptor 98 from either a main paper tray 110 or from auxiliary paper trays 112 or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58 and image output controller 60.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice pointers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc. are carried out. Following processing, the data may be returned to main memory 56, sent to UI 52 for display on touchscreen 62, or sent to image output controller 60.

Image data output to image output controller 60 is decompressed and readied for printing by image generating processors 86 of PWBs 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Referring particularly to FIGS. 5A–5C, control section 7 includes a plurality of Printed Wiring Boards (PWBs) 70, PWBs 70 being coupled with one another and with System Memory 61 by a pair of memory buses 72, 74. Memory controller 76 couples System Memory 61 with buses 72, 74. PWBs 70 include system processor PWB 70-1 having system processors 78; low speed I/O processor PWB 70-2 having UI communication controller 80 for transmitting data to and from UI 52; PWBs 70-3, 70-4, 70-5 having disk drive controller/processors 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring particularly to FIG. 6, system control signals are distributed via a plurality of printed wiring boards (PWBs). These include EDN core PWB 130, Marking Imaging core PWB 132, Paper Handling core PWB 134, and Finisher Binder core PWB 136 together with various Input/ Output (I/O) PWBs 138. A system bus 140 couples the core PWBs 130, 132, 134, 136 with each other and with controller section 7 while local buses 142 serve to couple the I/O PWBs 138 with each other and with their associated core PWB.

On machine power up, the Operating System software is loaded from memory 56 to EDN core PWB 130 and from there to the remaining core PWBs 132, 134, 136 via bus 140, each core PWB 130, 132, 134, 136 having a boot ROM 147 for controlling downloading of Operating System software to the PWB, fault detection, etc. Boot ROMs 147 also enable transmission of Operating System software and control data to and from PWBs 130, 132, 134, 136 via bus 140 and control data to and from I/O PWBs 138 via local buses 142. Additional ROM, RAM, and NVM memory types are resident at various locations within system 2.

Efficient resource management, in particular scanner section 6, controller section 7, and printer section 8, sufficient electronic sub-system (ESS) memory and sufficient disk bandwidth are key to optimizing the performance of printing system 2. System performance is improved by minimizing the average turn-around time per job thus increasing job throughput and by minimizing the average percentage of print pitch skips per job thereby efficiently using the consumables of the machine. The basic ESS architecture consists of a limited pool of memory, system memory 61 coupled to scanner section 6 printer section 8, and a rigid spool disk 56.

All four components in accordance with the present invention are managed by a resource manager even though the input and output devices and the disk drive have their own controllers to carry out their specific functions. For example, although the resource manager does not control the scanner section 6, in terms of mechanically scanning a document it does restrict when the scanner can begin scanning by not providing enough memory to begin operating. The main function of the ESS is to allow the system to accept and execute scan/print jobs. The three basic steps of the scan/print function are 1) scan the set of originals into memory, 2) store each original as a compressed bitmap onto the spool disk 56, and 3) print the desired number of copies of the set of originals. The resource, manager executes each of the three steps concurrently.

Because of the limited amount of memory 61 in the system, there comes a point in time when the system requires an image, not currently residing in memory but stored on the spool disk 56, to be in memory, and there is not enough available memory to hold the compressed bit map form of the image. The resource manager must then decide which of the pages currently in memory would be best to remove from memory to make room for the incoming image. The goal is to remove pages which will have little or no effect on performance.

Also, the ESS may not be able to provide the printer section 8, with the required image for printing because of a combination of the speed of the disk and a poorly compressed page. There may not be sufficient disk bandwidth to briing poorly compressed pages into memory in time for printing. Therefore, each job may incur a certain number of print pitch skips. A pitch skip is a time when the system is in full execution mode (charging and discharging of the photo-receptor) and yet a sheet of paper is not being imaged. Minimizing the number of print pitch skips is important in improving turn-around time and efficiently using the consumable of the machine. To minimize print pitch skips, the; minimum required resources and the optimal strategy to manage those limited resources need to be used.

With reference to the. flow chart, FIG. 7, a resource request for disk access to be completed by time T is illustrated at 230. It should be understood that multiple requests for multiple times can be handled. For example, a resource may ask that reads A and B be done by time $T_1$ and in the same request that reads C and D be completed by a different time $T_2$. The resource manager then makes a determination whether or not the operations can be completed by the requested times as illustrated at 232. If a disk access can be completed within the requested times, then the disk access is scheduled as shown as 234.

However, if the requested disk access to be completed by a given time cannot be completed by the requested time as shown at 240, there is calculated a required delay time 242, 244 for requests B and D. In other words, if reads B and D cannot be completed by time $T_1$ and $T_2$ respectively, there will be a calculation of a necessary delay time equal to the difference between the a predicted completion time and the requested completion time. That is, if read B cannot be completed by $T_1$, the Resource Manager predicts the appropriate completion time for read B which is the difference between the predicted completion time and the requested completion time or Delta T.

In a similar manner the request for read D to be completed at $T_2$ would be converted into a Delta $T_2$ which is the difference between the predicted completion time and the requested completion time of read D. Delta $T_1$, and Delta $T_2$ are then compared to determine the maximum of the two delay times as illustrated at 246. This maximum delay time is then returned by the Resource Manager as shown at 248. This maximum delay time is converted by the Print Controller into a suitable machine delay or number of skipped pitches as illustrated at 250. The actual access operations are performed as shown at 252 with the appropriate number of skipped pitches. To implement these operations, the Resource Manager uses a timed disk operation queue. This operation queue includes disk access requests with associated start times. A start time is an absolute point in time in that the operation must be initiated in order to finish by the guaranteed time that was returned to the requesting resource. At the operations start time, the operation is removed from the queue. As operations are inserted into this queue, the Resource Manager predicts how long each of the operations will take to execute.

With reference to FIG. 8, in accordance with the present invention, there is illustrated a sequence of disk transfers along an axis representing time. Below the chart is a list of disk access requests waiting for available disk access time to complete their requests. The blocks marked 260, 262 and 264 are allocated disk access times to complete operations within a given period of time. These operation completion times have been guaranteed to the requesting resources. Blocks 266, 268, and 270 are disk access requests whose completion times are not guaranteed and are awaiting available disk access time to complete their requests.

When sufficient bandwidth is released by the completion of an operation, such as operation 260, 262 or 264 or a combination of operations for the completion of waiting operations, the Resource Manager 216 then selects the appropriate waiting operation for access. As illustrated, for example, operation 266 is moved into an allocated time slot with a suitable start time to complete the operation within the appropriate time. In general, the Resource Manager continually evaluates the priority of requests such as 266, 268 and 270, and also frees the memory upon the completion of some disk accesses to move requests from the waiting condition to the allocation and completion condition. The Resource Manager eliminates the need for every resource to directly interact with one another for disk access time. Once a request is made, it can be determined at that time, if and when the request can be filled. Thus, various sources within the system know when the request will be filled without knowing or needing to know where the memory availability actually came from.

FIG. 9, is a flow chart illustrating the above feature. Block 272 is a request for disk bandwidth. At 274, the decision is made whether or not bandwidth is available within a required completion time. If not, the requesting resource or operation is put in or remains in the bandwidth request queue as illustrated at 276. If bandwidth is available, there is a calculation or determination of the available bandwidth at 276. At 278, there is a decision made if any operations in the queue can be completed with the available bandwidth. If not, the system must wait for additional available bandwidth as shown at 280. If operations or requests on the queue can be completed, the highest priority requester or operation is selected at 282 and the BW access is completed at 284.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an electronic image processing apparatus having image processing means including an electronic scanner and an electronic printer for forming an image, a controller for directing operation of the image processing means, the controller including a mass memory device for storing data to be printed, random access memory, a printer, and a Resource Manager, the random access memory interconnected between the printer and the mass memory device, the method of ensuring access to the random access memory for conveying data from the mass memory device to the printer via the random access memory comprising the steps of:

requesting by the printer from the Resource Manager guaranteed times for accessing data from the mass memory device to the random access memory, providing a reservation procedure by the Resource Manager to the printer allowing the printer to schedule predetermined mass memory read operations to be completed at predetermined different times, and returning a delay time by the Resource Manager to the printer control for mass memory read operations that cannot be completed within the requested time.

2. The method of claim 1 including a completion time predicted by the Resource Manaqer and wherein said delay time is the difference between the completion time and the requested guaranteed time and includes the step of converting said delay time into a given number of skipped printer pitches.

3. The method of claim 1 including the step of forming a timed disk operation queue by the Resource Manager, the disk operations in the queue having associated start times.

4. The method of claim 3 wherein the step of forming a timed disk operation queue by the Resource Manager includes the step of removing operations from the queue at the operations start time.

5. The method of claim 3 wherein the step of forming a timed disk operation queue by the Resource Manager includes the step of transferring selected operations to the timed queue to guarantee random access memory availability to guarantee random access memory availability at the selected operations completion time.

6. The method of claim 3 wherein the step of forming a timed disk operation queue by the Resource Manager includes the step of allowing a plurality of random access memory requests to be satisfied by the Resource Manager.

7. An electronic image processing system comprising an electronic scanner and an electronic printer for forming an image, a controller for directing operation of the image processing means, the controller including a mass memory device for storing data to be printed, random access memory, a printer control, and a Resource Manager, the random access memory interconnected between the printer control and the mass memory device, the Resource Manager ensuring access to the random access memory for conveying data from the mass memory device to the printer via the random access memory, the Resource Manager including a mass memory device scheduler to provide printer access to the random access memory, the mass memory device scheduler having reservation means to reserve mass memory device access at predetermined times and means to determine that access to the mass memory device is invalid within a given time.

8. The system of claim 7 including conversion means for converting said given time into a given number of skipped printer pitches.

9. The system of claim 7 wherein the Resource Manager includes a reservation queue for forming timed disk operations having associated start times.

10. The system of claim 9 wherein the Resource Manager includes means to transfer selected operations to the reservation queue in order to provide guaranteed random access memory at predetermined times.

11. The system of claim 7 wherein the mass memory device is a plural disk memory system.

12. In an electronic image processing apparatus having image processing means including a plurality of resources for forming an image, a controller for directing operation of the image processing means, the controller including a mass memory device and a random access memory, and a Resource Manager, the method of ensuring access to the random access memory for conveying data from the mass memory device to at least one of the plurality of resources via the random access memory comprising the steps of:

requesting from the Resource Manager guaranteed times for transferring data from the mass memory device to the random access memory, and providing a reservation queue by the Resource Manager allowing said one of the plurality of resources to schedule predetermined mass memory read operations to be completed at predetermined different times.

13. The method of claim 12 including the step of returning a delay time by the Resource Manager to said one of the plurality of resources for mass memory read operations that cannot be completed within the requested time.

14. The method of claim 12 including the step of forming a timed disk operation queue by the Resource Manager, the disk operations in the queue having associated start times.

15. The method of claim 14 wherein the step of forming a timed disk operation queue by the Resource Manager includes the step of removing operations from the queue at the operations start time.

16. The method of claim 14 wherein the step of forming a timed disk operation queue by the Resource Manager includes the step of transferring selected operations to the queue to guarantee random access memory availability for the selected operations.

17. The method of claim 14 wherein the step of forming a timed disk operation queue by the Resource Manager includes the step of allowing a plurality of random access memory requests to be satisfied by the Resource Manager.

18. In a printer having random access memory RAM, a mass memory device and a mass memory access queue, a method of guaranteeing access to the mass memory device via RAM comprising the steps of:

requesting predetermined mass memory device bandwidth, monitoring RAM space to determine if suitable RAM space is available to access said memory device bandwidth, selecting the request for said memory device bandwidth in a mass memory device request queue if suitable RAM space is not available, and transferring the request for said mass memory device bandwidth to the mass memory access queue when suitable RAM space is available.

* * * * *